Nov. 3, 1931.     H. W. HOUCK     1,829,897
RECTIFIER
Filed April 15, 1925
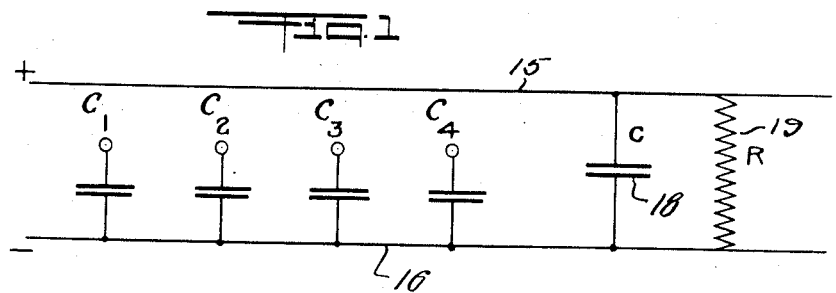
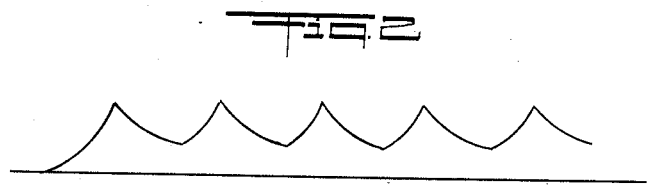
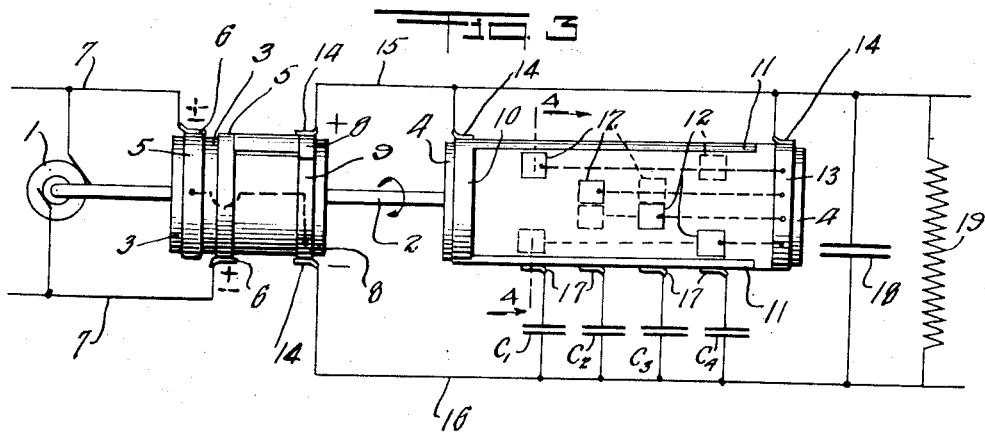
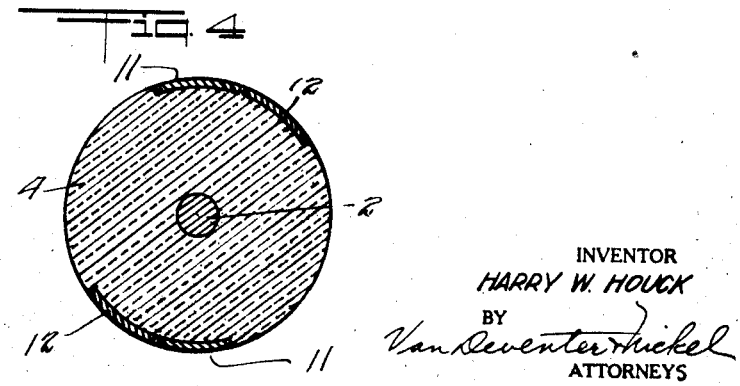
INVENTOR
HARRY W. HOUCK
BY
Van Deventer Hickel
ATTORNEYS Patented Nov. 3, 1931 1,829,897

UNITED STATES PATENT OFFICE

HARRY W. HOUCK, OF WEST ORANGE, NEW JERSEY, ASSIGNOR TO DUBILIER CONDENSER CORPORATION, OF NEW YORK, N. Y., A CORPORATION OF DELAWARE

RECTIFIER

Application filed April 15, 1925. Serial No. 23,362.

My invention relates to electrical reitifiers, and more particularly to alternating current rectifiers.

An object of my invention is to provide a method for rectifying alternating current by means comprising electrical condensers.

Another object of my invention is to provide means to charge simultaneously the condensers used with my rectifying device.

A further object of my invention is to provide means to successively discharge the electrical condensers after they have been charged.

A still further object of my invention is to provide a mechanical alternating current rectifier which is strong and sturdy in construction, and consisting of few parts which are not liable to get out of order even after long and continued use.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 represents a diagrammatic view of the condenser circuit;

Fig. 2 represents the uni-directional current curve of the discharging condensers;

Fig. 3 is a diagrammatic view of my rectifying device showing the condenser connections and the load circuit;

Fig. 4 is a cross sectional view along line 4—4 of Fig. 3, looking in the direction of the arrows.

Referring to the drawings, and more particularly to Fig. 3, I have shown my rectifying device comprising a synchronous motor 1 having its armature shaft connected with a shaft 2 upon which are mounted controlling means shown at 3 and 4.

The controller 3 is cylindrical and is provided with suitable slip rings 5 which are connected to opposite sides of an alternating current source by means of the brushes 6 and the leads 7. Contact segments 8 on the controller are each connected with one of the slip rings 5, and between the segments are placed raised insulating collars or ribs 9, which are flush with the segments. The motor 1 is, of course, connected across the leads 7.

The other controller 4, which is also mounted on the shaft 2, is provided with a slip ring 10 having axial or lateral extensions 11. On the surface of the condenser controller are placed metallic contact means or segments 12 which are all connected to common contact means, such as a slip ring 13. Connection between the contact segments 8 on the controller 3 and the slip rings on the controller 4 is made by means of the brushes 14 and the leads 15 and 16.

To the lead 16 are connected the storage condensers $C_1$, $C_2$, $C_3$, and $C_4$. These condensers each make contact in turn with one of the metallic segments 12 by means of the brushes 17. A reservoir condenser 18 and a resistance 19 are shunted across the leads 15 and 16.

When the controller 4 is caused to revolve by the armature shaft of the synchronous motor 1, the slip ring 10 having the axial extensions 11 is connected with the condensers twice, each revolution, thus giving them a positive charge; then the metal contact segments 12 make connection with the condensers and discharge them successively through the brushes 17 and brush 14 on the slip ring 13 to storage condenser 18. This circuit is shunted by means of a resistance 19, or may be connected to any other load circuit. The condensers $C_1$, $C_2$, $C_3$, $C_4$, are charged twice per revolution and discharged one at a time through the metal contacts by means of the slip ring 13.

By means of the controllers 3 and 4, the condensers $C_1$, $C_2$, $C_3$, $C_4$ are simultaneously charged from the alternating current circuit at the peak value of each half cycle. The controller 4 discharges the condensers through resistance 19 by shorting the terminals of the condensers to the line, which is connected through a resistance to a load circuit, thus producing a current curve, as shown in Fig. 2 of the drawings. The condenser $C_4$ is discharged as the next half cycle, which has been reversed by the commutator and is now positive, approaches its peak value. The condensers $C_1$, $C_2$, $C_3$ and $C_4$ are again charged at the peak value and discharged as before. It will be seen that the greater the number of condensers connected in a line, the smoother the current curve and the less filtering action required to produce a pure direct current.

For example, suppose the lower brush 6 is positive, then the upper contact 8 must be positive, and upper brush 6 and lower segment 8 negative. The condensers are all charged at once through ring 10 and the extension 11 in lowermost position. As the motor and controllers rotate in synchronism with the cyclic frequency of the supply line, on the next half revolution the upper lead 7 is positive in voltage. But this lead is now connected to the upper brush 14 of the controller 3, and the condensers are charged as before. They discharge again in succession through the contacts 12 as the brushes 17 and extension 11 once more separate. Any kind of work circuit can, of course, be connected to the terminals of the condenser 18, in addition to or in place of resistance 19.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In combination with a source of alternating current, a rotating shaft, a pair of controllers on said shaft, one of the controllers having slip rings thereon, a plurality of electric condensers, the other controller having a slip ring with axial extensions adapted to connect the condensers simultaneously with the alternating current source, and contact means to discharge the condensers successively.

2. In combination with a source of alternating current, a shaft, a plurality of condensers, a pair of controllers mounted upon the shaft and rotating therewith, one of said controllers having slip rings connected to said source, the other controller having a slip ring with axial extensions adapted to connect the condensers simultaneously with the alternating current source, and a series of segments arranged in spaced relation upon the surface of the other controller, said segments being adapted to connect successively with the condensers.

3. In combination with a source of alternating current, a shaft, a plurality of condensers, a pair of controllers mounted upon the shaft and rotating therewith, one controller having slip rings connected to said source and contact segments to be joined to said condensers, the other controller having a slip ring with axial extensions, and a series of contact segments mounted on the surface of said controller at angular distances apart, the segments being adapted to connect successively with the condensers.

4. Means for rectifying alternating current comprising switching means for simultaneously connecting a plurality of condensers to an alternating current supply circuit, switching means for reversing the conection of each condenser to the supply circuit at each half cycle of current to keep the respective terminals of the condensers at the same polarity, and means for successively discharging said condensers to the output terminal of the rectifier.

5. Means for rectifying alternating current comprising switching means for simultaneously connecting a plurality of condensers to an alternating current supply circuit, mechanical switching means for reversing the conection of each condenser to the supply circuit at each half cycle of current to keep the respective terminals of the condenser at the same polarity, and switching means for successively discharging said condensers to the output terminals of the rectifier.

6. Means for rectifying alternating current comprising mechanical switching means for simultaneously connecting a plurality of condensers to an alternating current supply circuit, mechanical switching means for reversing the connection of each condenser to the supply circuit at each half cycle of current to keep the respective terminals of the condensers at the same polarity, and mechanical switching means for successively discharging said condensers to the output terminals of the rectifier.

7. Means for rectifying alternating current comprising a controller having contacts for simultaneously connecting a plurality of condensers to an alternating current supply circuit, means for actuating said controller in synchronism with the supply current, the controller having contacts for reversing the connection of each condenser to the supply circuit at each half cycle of current to keep the respective terminals of the condensers at the same polarity, said controller having contact means for successively discharging said condensers to the output circuit.

Signed at New York, in the county of New York and State of New York, this 14th day of April, A. D. 1925.

HARRY W. HOUCK.